United States Patent
Schroth

[19]

[11] Patent Number: 6,065,367
[45] Date of Patent: *May 23, 2000

[54] ACTUATING DEVICE WITH A ROTATABLE POT-SHAPED CLOSURE HEAD FOR MULTI-POINT SAFETY BELTS

[75] Inventor: Karl-Jürgen Schroth, Soest, Germany

[73] Assignee: Carl-Jürgen Schroth, Soest, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/716,177

[22] PCT Filed: Feb. 16, 1996

[86] PCT No.: PCT/DE96/00246

§ 371 Date: Oct. 11, 1996

§ 102(e) Date: Oct. 11, 1996

[87] PCT Pub. No.: WO96/25062

PCT Pub. Date: Aug. 22, 1996

[30] Foreign Application Priority Data

Feb. 17, 1995 [DE] Germany .............. 195 05 429

[51] Int. Cl.⁷ .............. G05G 1/10; A44B 1/04; H01H 3/16
[52] U.S. Cl. .......... 74/553; 200/61.58 B; 24/168
[58] Field of Search .............. 200/61.58 B, 229; 24/168, 205.17, 205; 74/553, 10.8, 10.7; 70/214; 297/468; 292/347; D11/200; 251/267

[56] References Cited

U.S. PATENT DOCUMENTS

| | | | |
|---|---|---|---|
| 2,255,258 | 9/1941 | Lethern et al. | 24/205 |
| 3,510,921 | 5/1970 | Gilmore | 24/205.17 |
| 3,942,760 | 3/1976 | King | 251/267 |
| 5,410,780 | 5/1995 | Silagy | 24/168 |

FOREIGN PATENT DOCUMENTS

| | | | |
|---|---|---|---|
| 0161664 | 11/1985 | European Pat. Off. . | |
| 1090972 | 10/1960 | Germany . | |
| 1137633 | 10/1962 | Germany . | |
| 4301403-A1 | 7/1994 | Germany | 24/168 |
| 2183714 | 6/1987 | United Kingdom . | |

*Primary Examiner*—Tamara L. Graysay
*Assistant Examiner*—Marcus Charles
*Attorney, Agent, or Firm*—Friedrich Kueffner

[57] ABSTRACT

An actuation device for a lock of a multi-point safety belt to be placed in a position of use against a body of a user of the safety belt includes a rotatable cup-shaped locking head, wherein at least one recess in provided in the circumference of the locking head in a downwardly directed circumferential portion in the position of use of the locking head, and wherein the recess in configured as a finger recess. The locking head further may include a circumferential portion located diametrically opposite the finger recess and facing upwardly in the position of use, wherein the at least flattened finger depression has a radius greater than the radius of the finger recess.

1 Claim, 3 Drawing Sheets

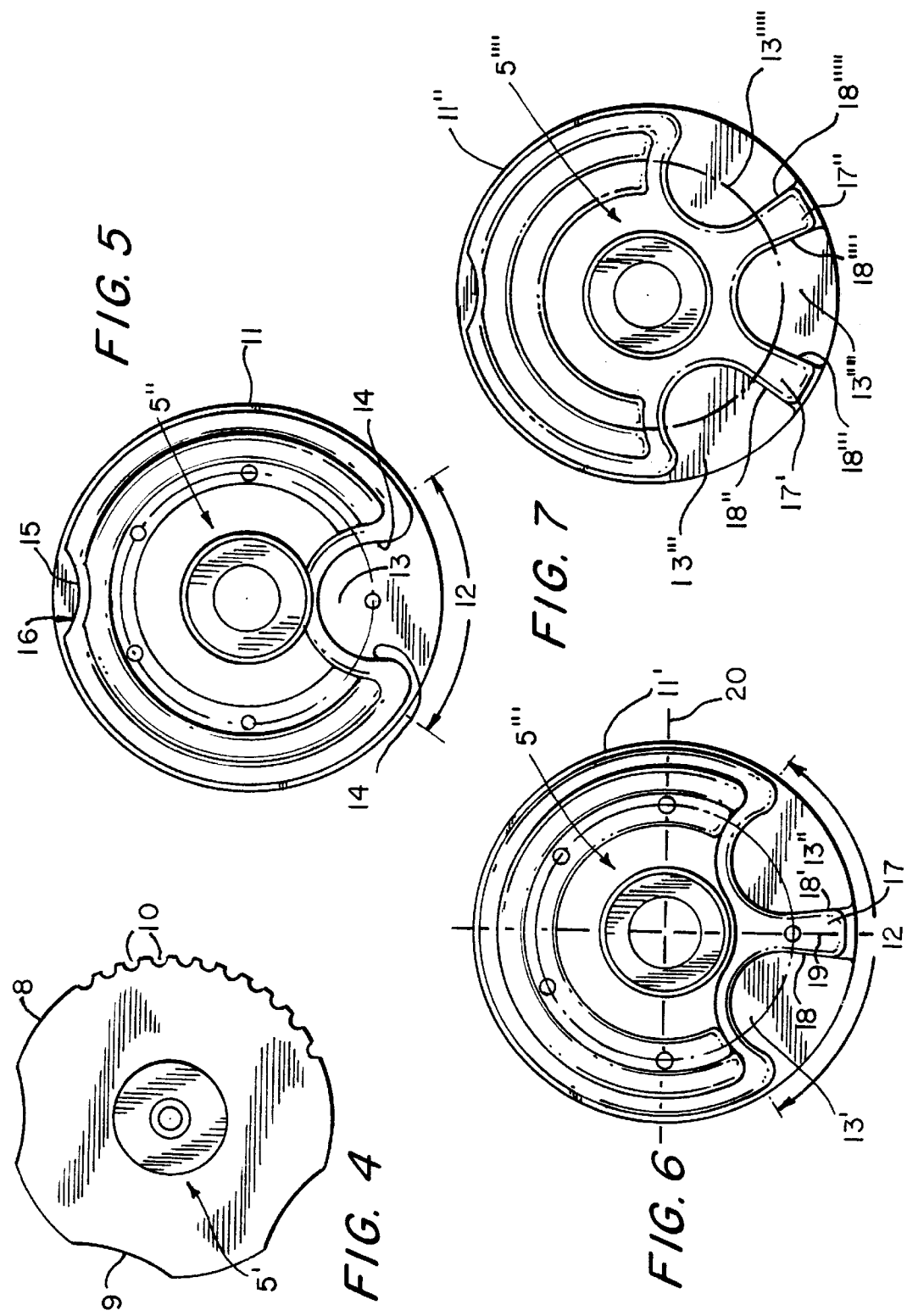

6,065,367

ACTUATING DEVICE WITH A ROTATABLE POT-SHAPED CLOSURE HEAD FOR MULTI-POINT SAFETY BELTS

BACKGROUND OF THE INVENTION

1. Field of the Invention

The invention relates to an actuating device with a rotatable cup-shaped locking head for multi-point safety belts.

2. Description of the Related Art

In accordance with a known type of construction which has been incorporated into the applicable safety standards, actuating devices for multi-point safety belts, particularly for racing cars, are constructed as levers. The levers protrude above the flat plane of the base member as well as beyond the diameter thereof; this is in order to achieve a good accessibility as well as in order to reduce the force to be applied, so that a lock can still be actuated even after an accident.

In aircraft construction, actuating devices are either equipped with substantially grooved locking heads or with very smooth cup-shaped locking heads.

The first embodiment is intended to achieve a sufficient frictional engagement between the hand of the user and the actuating device. However, the first embodiment has the disadvantage that, for example, pilots during the check prior to departure will unintentionally engage the check list holder in one of the grooves and will unintentionally open the lock because the angular movement of about 30° to 40° is kept relatively small in these locks.

In order to prevent these disadvantages, smooth cup-shaped constructions were used in the second embodiment. However, these constructions have the disadvantage that, when loosening the belt, i.e., when actuating the lock, a user must grasp the lock with a hand which is curved like a trough in order to produce a sufficient fictional engagement for actuation. However, it is known that a hand which has sustained an injury especially on the back of the hand is no longer able to carry out such a grasping function. Moreover, in a safety belt which is used in an ambulance aircraft, the use of such an actuating device leads to substantial safety risks because its actuation with the hand of a rescue worker which may be covered, for example, with medicaments or even blood, is hardly possible any more because of the particularly low coefficient of friction.

SUMMARY OF THE INVENTION

Starting from the state of the art, it is the object of the present invention to provide actuating devices which avoid the described disadvantages.

This object is met in accordance with the invention by an actuating device for the lock of a multi-point safety belt which includes a rotatable cup-shaped locking head with at least one recess on the circumference thereof, wherein the recess is arranged in a downwardly directed circumferential portion in the position of use of the locking head, and wherein the recess is constructed as a finger recess.

For this purpose, the locking head is constructed cup-shaped approximately corresponding to its diameter. If the mechanics of the lock are stiff, the diameter of the locking head may protrude beyond the outer diameter of the base member in order to provide a greater lever length by the increased diameter. The actuating device advantageously includes an inclined insertion surface for the belt tongues. At least one finger recess is provided on a circular arc-shaped portion of the cup-shaped locking head which faces downwardly in the position of use when the lock rests against the body of the belt user. The finger recess has two flanks for rotating the locking head.

If more than one finger recess is provided, these finger recesses are located in a lower circular arc portion of the locking head as seen from the belt user. Webs whose flanks serve as actuating surfaces are provided between the individual finger recesses. The opening force is introduced between the webs. Advantageously, the webs are directed radially.

The webs located between the finger recesses do not protrude above the surface of the locking head. The flanks of the finger recesses are also positioned at an angle of, if possible, not greater than 90° as measured from the vertical center line of the lock. As a result, for example, during a rollover of a vehicle, for example, a rally sports car or a tumbling movement of an aircraft, it is prevented that the freely swinging arms and hands of the occupants come into frictional engagement with the locking head and open the locking head. Also the check list holder of a pilot can no longer engage the locking head and cannot lead to an unintentional opening of the lock.

On the other hand, even under the most difficult conditions, it is still possible to actuate the lock by applying with the fingers a force on the actuating device constructed in this manner.

BRIEF DESCRIPTION OF THE DRAWING

In the drawing:

FIG. 4 is a top view of an actuating device of a conventional lock;

FIG. 5 is a top view showing an actuating device according to the present invention;

FIG. 6 is a top view of another embodiment of the actuating device according to the present invention;

FIG. 7 is a top view of yet another embodiment of the actuating device according to the present invention.

DESCRIPTION OF THE PREFERRED EMBODIMENTS

Figure 1:
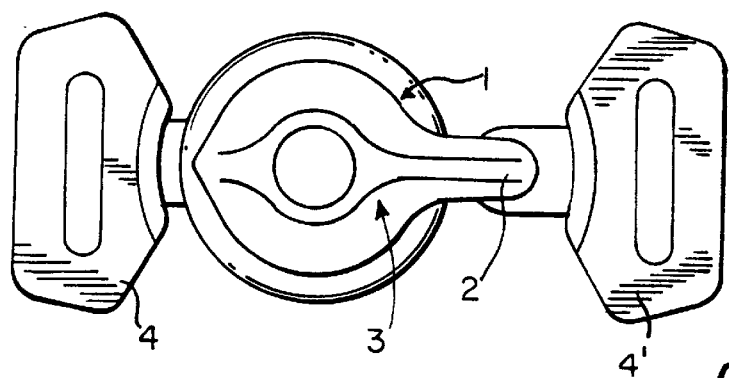
FIG. 1 is a top view of a conventional lock.
Figure 2:
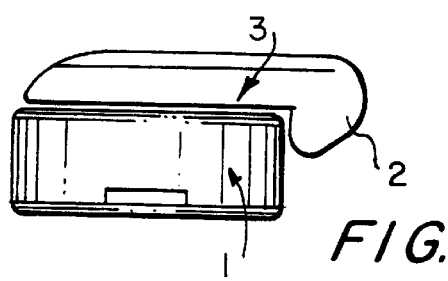
FIG. 2 is a side view of the lock of FIG. 1.

FIGS. 1 and 2 are a top view and side view, respectively, showing a lock 1 of conventional construction with substantially protruding ends 2 of an actuating lever 3 and belt tongues 4, 4' belonging to the lock 1.

Figure 3:
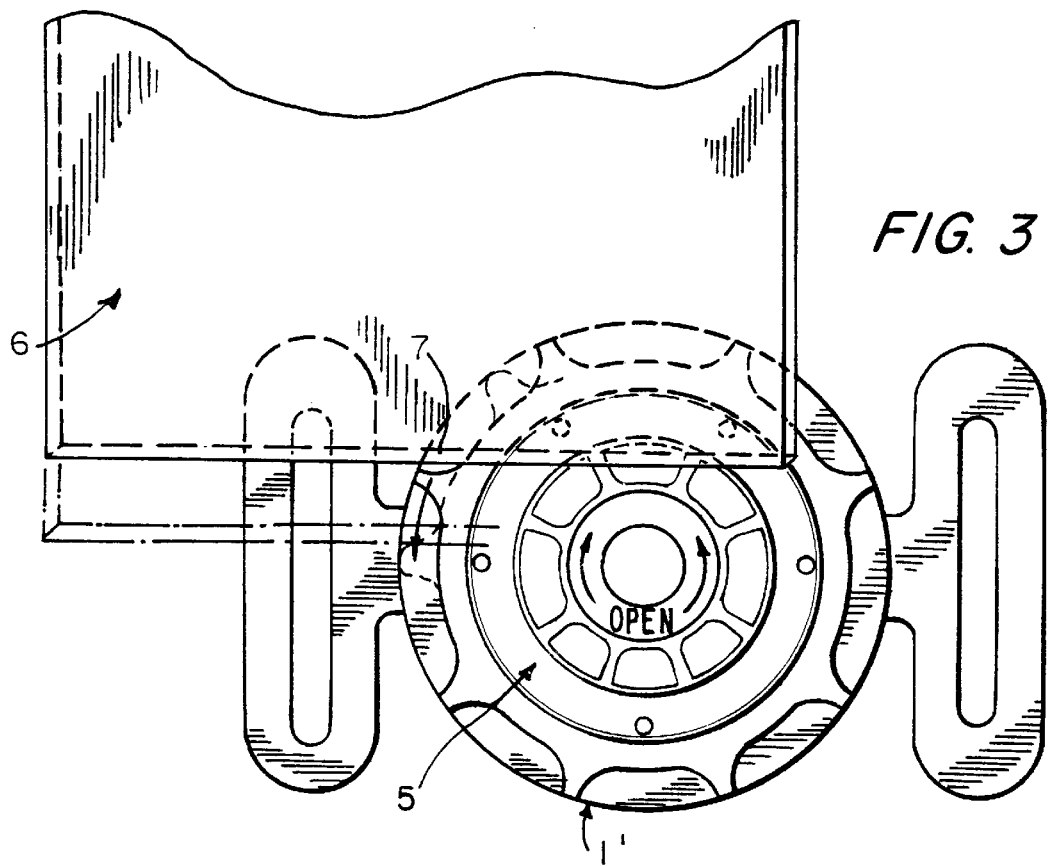
FIG. 3 is a top view, on a larger scale, showing another embodiment of a conventional lock.

FIG. 3 shows another known embodiment of an actuating device 5 with a check list holder 6 of a pilot which is in engagement with a deep groove 7 provided in this actuating device 5 so that there is the threat that the check list holder 6 will open the lock 1'.

FIG. 4 shows an actuating device 5' whose outer contour 8 is provided with slight undulations 9 or troughs 10 in order to ensure at least an albeit small frictional coefficient during grasping.

FIG. 5 shows an actuating device 5" according to the invention with a pot-shaped locking head 11. A finger recess 13 is provided in an area 12 of the locking head 11 which faces downwardly at the body of the belt user. The flanks 14 of the finger recess 13 extending toward the outer circumference serve to receive opening forces directed so as to cause a rotation of the locking head 11.

Located diametrically opposite the finger recess 13 is a finger depression 15 for providing an oppositely directed force, for example, by means of the thumb, during an opening procedure. The finger depression 15 is only a flattened area with a relatively large radius 16, so that there are no surfaces to which a force could be applied by arms, hands or any objects in the cockpit.

FIG. 6 shows an actuating device 5''' according to the invention which is also initially provided with cup-shaped locking head 11' which has in the downwardly directed area 12' two finger recesses 13', 13" located next to each other. The two finger recesses 13', 13" are separated from each other by a web 17. The flanks 18, 18' of the web 17 constitute actuating surfaces against which sufficient forces can be applied for activating an opening procedure directed toward rotation. By arranging the two finger recesses 13', 13" offset relative to the center line 19, the inner summits of the finger recesses can be shifted more closely toward the horizontal center axis 20 of the actuating device 5''' than would be the case if only one finger recess is provided. This causes the flanks 18, 18' of the web 17 to be longer than when one finger recess 13 is provided in accordance with FIG. 5. This makes it possible to introduce the force by means of two fingers to the respective flanks 18, 18', so that a finger depression 15 according to FIG. 5 can be omitted.

FIG. 7 shows another possible construction of an actuating device 5"" in accordance with the invention in which three finger recesses 13''', 13"", 13''''' are provided in the locking head 11", wherein these finger recesses are also separated from each other by a web 17', 17" whose flanks 18", 18''' or 18"", 18''''' constitute the actuating surfaces directed toward rotation.

Figure 8:
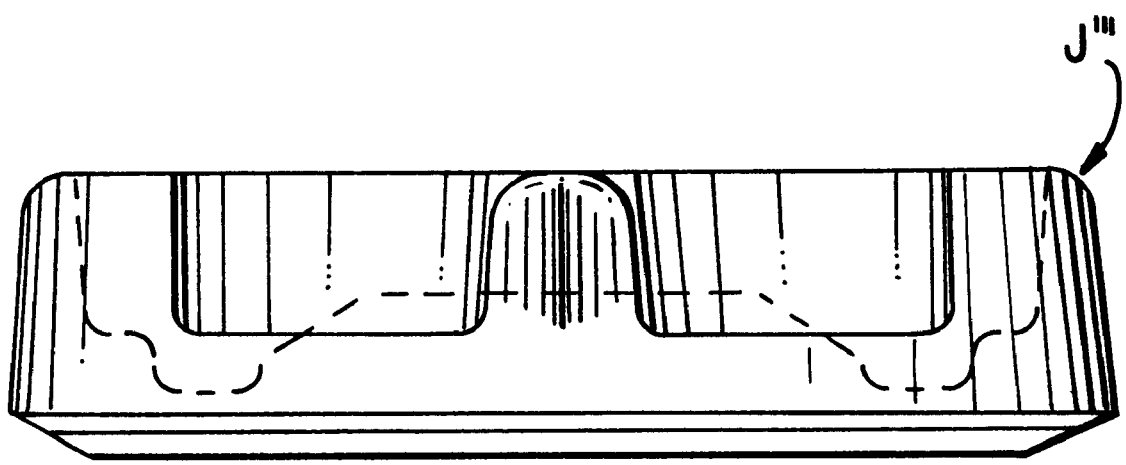
FIG. 8 is a side view of the actuating device of FIG. 6.

FIG. 8 is a side view showing the actuating device 5''' of FIG. 6.

What is claimed is:

1. An actuating device for a lock of a multi-point safety belt, the lock being adapted to be placed in a position of use against a body of a user of the multi-point safety belt, the actuating device comprising a rotatable cup-shaped locking head having a circumference, the circumference having two U-shaped finger recesses arranged next to each other, the recesses being arranged in a downwardly directed circumferential portion in the position of use of the locking head, a radially directed web extending between the finger recesses, the web having flanks configured as actuating surfaces, wherein the web does not protrude above a surface of the locking head, and wherein inner summits of the two finger recesses are located close to a horizontal center axis of the actuating device.

* * * * *